(12) United States Patent
Deshpande et al.

(10) Patent No.: US 7,274,536 B2
(45) Date of Patent: Sep. 25, 2007

(54) TAPE HEAD READ/WRITE MODULE

(75) Inventors: Annayya P. Deshpande, San Jose, CA (US); Hoodin Hamidi, Walnut Creek, CA (US); Icko E. Iben, Santa Clara, CA (US); Kevin Thuy Luong, San Jose, CA (US); Sassan K. Shahidi, San Jose, CA (US); Abel J. Taina, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/449,443

(22) Filed: Jun. 7, 2006

(65) Prior Publication Data

US 2006/0227457 A1 Oct. 12, 2006

Related U.S. Application Data

(62) Division of application No. 10/431,247, filed on May 6, 2003, now Pat. No. 7,082,013.

(51) Int. Cl.
G11B 5/127 (2006.01)

(52) U.S. Cl. .................................. 360/234.7

(58) Field of Classification Search ............ 360/235.4, 360/234.4, 234.7
See application file for complete search history.

(56) References Cited

U.S. PATENT DOCUMENTS

| | | | |
|---|---|---|---|
| 3,657,806 A | 4/1972 | Simon | |
| 4,017,965 A | 4/1977 | Brutsch et al. | |
| 4,219,853 A | 8/1980 | Albert et al. | |
| 4,571,651 A | 2/1986 | Reid et al. | |
| 5,516,430 A | 5/1996 | Hussinger | |
| 5,537,732 A * | 7/1996 | Fukuda et al. | 29/603.12 |
| 5,548,886 A | 8/1996 | Kojima et al. | |
| 5,587,857 A | 12/1996 | Voldman et al. | |
| 5,742,998 A | 4/1998 | Jones, Jr. | |
| 5,745,979 A | 5/1998 | Fontana, Jr. et al. | |
| 5,768,062 A | 6/1998 | Anderson et al. | |
| 5,771,571 A | 6/1998 | Voldman et al. | |
| 6,094,803 A | 8/2000 | Carlson et al. | |
| 6,160,682 A * | 12/2000 | Yamazaki et al. | 360/234.7 |
| 6,181,531 B1 | 1/2001 | Koshikawa et al. | |
| 6,195,231 B1 | 2/2001 | Sedlmayr et al. | |
| 6,278,581 B1 | 8/2001 | Egawa et al. | |
| 6,424,496 B1 | 7/2002 | Kaiser et al. | |
| 6,587,314 B1 * | 7/2003 | Lille | 360/313 |

* cited by examiner

*Primary Examiner*—Hoa T. Nguyen
*Assistant Examiner*—Mark Blouin
(74) *Attorney, Agent, or Firm*—Timothy N. Ellis

(57) ABSTRACT

A tape head read/write module that has a composite air bearing surface, and a method and apparatus for embedding a chip in a substrate to form a composite air bearing surface. An example of the module includes a substrate that has an air bearing surface, a front, a back, and a chip receiving slot. The air bearing surface of the substrate has a first portion adjoining a first side of the chip receiving slot, and a second portion adjoining a second side of the chip receiving slot. The module also includes a chip that has an air bearing surface, a bottom surface, a front, a back, and active elements. The active elements are located proximate the front of the chip. The chip is positioned in the chip receiving slot in the substrate, with the air bearing surface of the chip substantially aligned with the air bearing surface of the substrate.

26 Claims, 7 Drawing Sheets

TAPE HEAD READ/WRITE MODULE

CROSS-REFERENCE TO RELATED APPLICATIONS

This application is a divisional of U.S. patent application Ser. No. 10/431,247 filed May 6, 2003 now U.S. Pat. No. 7,082,013, titled "Method and apparatus for embedding a chip in a substrate to form a composite air bearing surface", which is hereby incorporated herein by this reference.

BACKGROUND

1. Technical Field

The present invention relates to heads used to write and retrieve information on magnetic storage tape media. More particularly, the invention concerns a method for embedding a chip that has active elements, in a substrate, to form a composite air bearing surface that may be used, for example, in a tape head.

2. Description of Related Art

Magnetic tape is widely used for storing data in computing systems. Tape heads are used for writing information to the tape and reading information from the tape. A tape head typically includes two modules that each have a plurality of reading and writing elements, that may be called active elements. In each module, the reading and writing elements are formed in a substrate that has a smooth air bearing surface (ABS) which makes contact with and supports the flexible tape as it travels. This type of tape head may be called a contact recording tape head. To minimize the occurrence of decreased signals from spacing losses, damage to the tape, and other problems, the air bearing surface of each module must be very smooth, so that the tape can pass over each module in close proximity to the reading and writing elements. Because of its degree of smoothness, an air bearing surface may be referred to as being optically polished.

Because the reading and writing elements in each module span only a small portion of the tape width, during operation the tape head is moved laterally so that the substrate in each module moves laterally across the tape to line up the reading and writing elements with the tracks on the tape that are being read from or written to. Consequently, the substrates are wider than the width of the tape, and are considerably wider than the portion of the tape spanned by the reading and writing elements, to maintain support of the tape surface and to avoid potentially tearing the tape with sharp edges while lining up the reading and writing elements with tracks that are not in the center of the tape.

Traditionally, the reading and writing elements and the substrate of a module are formed in a semiconductor wafer. Forming the substrate in the wafer requires a much larger area of the wafer than is required for the reading and writing elements. Due to the high cost of wafer space, forming the substrate in the wafer substantially increases the cost of making a module. Consequently, existing methods for making tape heads are not completely cost effective.

SUMMARY

One aspect of the invention is a method for embedding a chip in a substrate, to form a composite air bearing surface. An example of the method includes securing the substrate in a fixed position, and aligning the chip in a first direction with a chip receiving slot in the substrate. The method also includes depositing adhesive in the chip receiving slot in the substrate, and aligning the chip in a second direction with the chip receiving slot in the substrate. The chip is then pushed into the adhesive in the chip receiving slot. The method further includes detecting when an air bearing surface of the chip is substantially at a desired protrusion in a third direction in relation to an air bearing surface of the substrate. Responsive to detecting that the air bearing surface of the chip is substantially at the desired protrusion in the third direction in relation to the air bearing surface of the substrate, the operation of pushing the chip into the adhesive is ceased. The adhesive is at least partially cured to bond the chip to the substrate with the air bearing surface of the chip substantially at the desired protrusion in the third direction, and with the chip substantially aligned in the first and second directions with chip receiving slot in the substrate.

Another aspect of the invention is a tape head read/write module that has a composite air bearing surface. The module includes a substrate that has an air bearing surface, a front, a back, and a chip receiving slot. The chip receiving slot has a front at the front of the substrate, a back at the back of the substrate, a first side, a second side, and a bonding surface. The air bearing surface of the substrate has a first portion adjoining the first side of the chip receiving slot, and a second portion adjoining the second side of the chip receiving slot. The module also includes a chip that has an air bearing surface, a bottom surface, a front, a back, and active elements. The active elements are located proximate to the front of the chip. The chip is inserted in the chip receiving slot in the substrate, with the air bearing surface of the chip substantially aligned with the air bearing surface of the substrate, and with the back of the chip substantially aligned with the back of the substrate.

Other aspects of the invention are described in the sections below, and include, for example, an apparatus for aligning and bonding a chip with a substrate to form a composite air bearing surface.

The invention provides a number of advantages. The invention permits making a composite air bearing surface by embedding a chip that has reading and writing elements, in a substrate, which makes it unnecessary to form the substrate in the expensive semiconductor wafer with the chip. Because the substrate is much larger than the chip and is not made in the wafer, a larger number of chips can be made in the wafer, which advantageously reduces the cost of each chip. Additionally, a larger number of chips can be produced in each row on the wafer, and consequently, the lapping cost per chip is lowered because a larger number of chips can be simultaneously lapped. Further, the composite air bearing surface does not require lapping after the chip is embedded in the substrate, which can be an expensive operation. The invention also provides a number of other advantages and benefits, which should be apparent from the following description.

DETAILED DESCRIPTION

The nature, objectives, and advantages of the invention will become more apparent to those skilled in the art after considering the following detailed description in connection with the accompanying drawings.

I. Hardware Components and Interconnections

A. Tape Head Module

Figure 1:
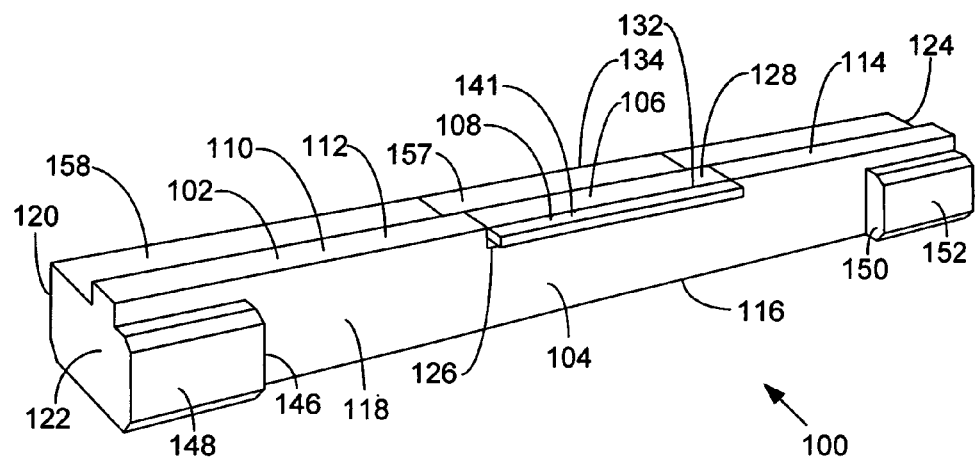
FIG. 1 is a perspective view of a chip embedded in a substrate to form a composite air bearing surface in accordance with an example of the invention.
Figure 2:
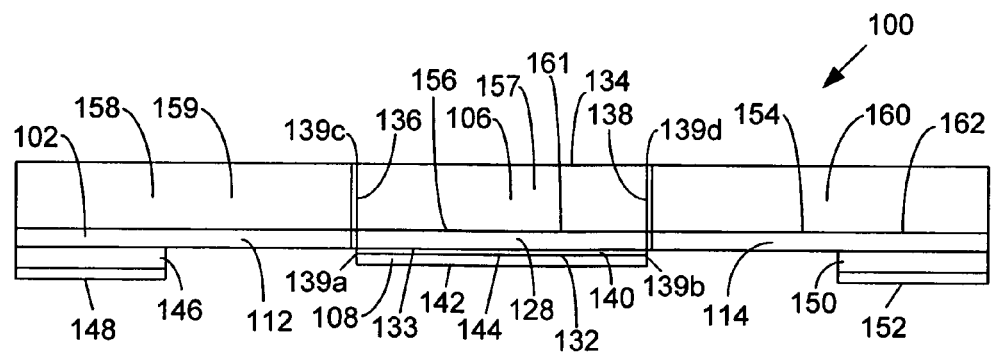
FIG. 2 is a top view of a chip embedded in a substrate to form a composite air bearing surface in accordance with an example of the invention.
Figure 3:
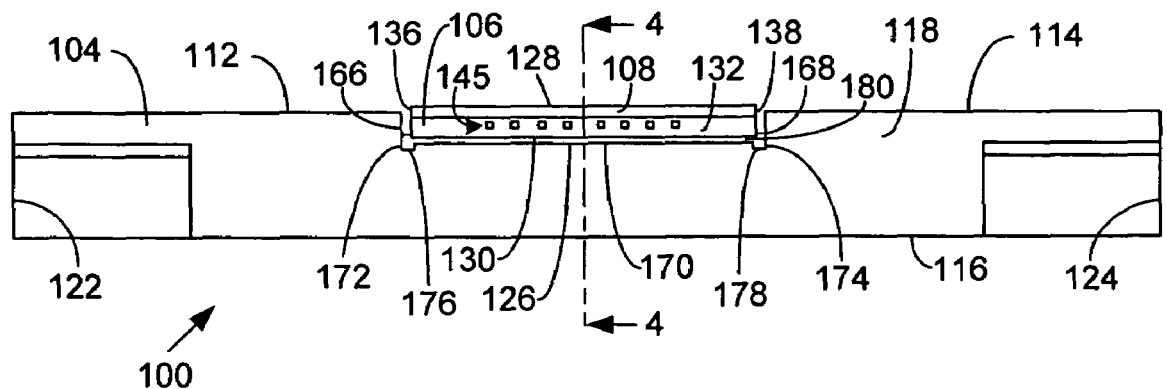
FIG. 3 is a front view of a chip embedded in a substrate to form a composite air bearing surface in accordance with an example of the invention.
Figure 4:
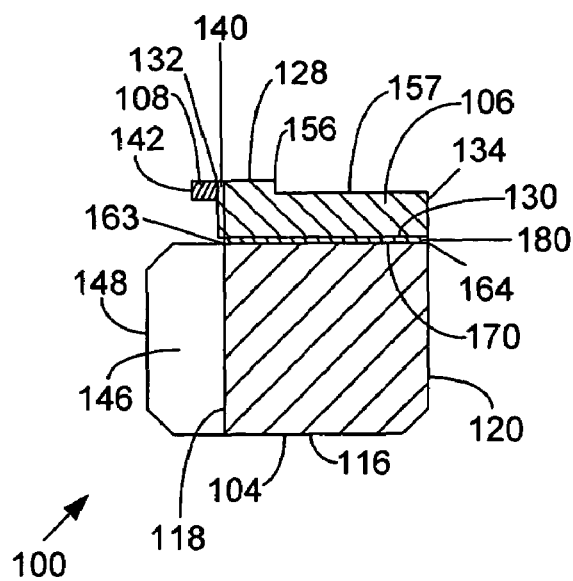
FIG. 4 is a sectional view taken along the line 4-4 in FIG. 3, of a chip embedded in a substrate to form a composite air bearing surface in accordance with an example of the invention.

One aspect of the invention concerns a read/write module that has a composite air bearing surface that may be used, for example, in a tape head. As an example, the read/write module may be embodied by the module 100 shown in FIGS. 1-4. FIG. 1 is a perspective view of the module 100, FIG. 2 is a top view of the module 100, FIG. 3 is a front view of the module 100, and FIG. 4 is a sectional view of the module 100 taken along the line 4-4 in FIG. 3. The module 100 includes a composite air bearing surface 102, a substrate 104, a chip 106, and a closure 108. As an example, the substrate 104 and chip 106 may both be made of N58 AlTiC. The substrate 104 has a substrate air bearing surface 110 that has a first portion 112 and a second portion 114. The substrate 104 also has a bottom 116, a front 118, a back 120, a first side 122, a second side 124, and a chip receiving slot 126. The chip 106 has a chip air bearing surface 128, a bottom surface 130 (shown most clearly in FIGS. 3 and 4), a front 132 of the chip 106, a front 133 of the chip air bearing surface 128, a back 134, a first side 136, and a second side 138. The substrate air bearing surface 110 and the chip air bearing surface 128 together form the composite air bearing surface 102. The chip 106 also has a first front corner 139a (shown most clearly in FIG. 2), a second front corner 139b, a first back corner 139c, and a second back corner 139d. The chip 106 also has active elements 140 (shown most clearly in FIGS. 2 and 4) that are located proximate to the front 132 of the chip 106. Accordingly, the chip 106 may be referred to as an active element chip. The active elements 140 in the chip 106 may include, for example, eight readers, eight writers, and two servos. However, the active elements 140 could include larger or smaller numbers of readers, writers, and/or servos. The readers may be, for example, magneto resistive (MR) elements. The readers may also be called sensors. The closure 108 has a closure air bearing surface 141, a front 142, and a back 144, and the back 144 of the closure 108 is attached to the front 132 of the chip 106. Electrical leads (not shown) for the active elements 140 may be coupled to pads 145 on the front 132 of the chip 106 beneath the closure 108. In order to provide connections to the active elements 140, the number of pads 145 provided on the chip 106 may be greater than the number of pads 145 shown in FIG. 3.

The length of the substrate 104 from the first side 122 of the substrate 104 to the second side 124 of the substrate 104 may be, for example, about 22.5 mm. The height of the substrate from the bottom 116 of the substrate 104 to the air bearing surface 110 of the substrate 104 may be, for example, about 2.5 mm. The distance from the front 118 to the back 120 of the substrate 104 (the width of the substrate 104) may be, for example, about 2.0 mm. The substrate 104 may also include a first front protrusion 146 that has a face 148, and a second front protrusion 150 that has a face 152. The distance from the face 148 of the first front protrusion 146 and the face 152 of the second front protrusion 150 to the back 120 of the substrate 104 may be, for example, about 2.75 mm. The air bearing surface 110 of the substrate 104 has a back edge 154. The distance from the front 118 of the substrate 104 to the back edge 154 of the air bearing surface 110 on the substrate 104 may be, for example, about 0.63 mm, and in another example could be, for example about 0.80 mm. However, other distances could be utilized.

The tape used with the module 100 may, as an example, be about 1.27 cm (0.5 inch) wide. However, different tape widths could be used, and, if necessary, the width of the substrate 104 could be adjusted to accommodate different tape widths.

The length of the chip 106 from the first side 136 of the chip 106 to the second side 138 of the chip 106 may be, for example, about 6.8 mm. The thickness of the chip 106 from the bottom surface 130 of the chip 106 to the air bearing surface 128 of the chip 106 may be, for example, about 550±15 µm. The distance from the front 132 to the back 134 of the chip 106 (the width of the chip 106) may be, for example, about 2.0 mm. Thus, the bonding area on the bottom surface 130 of the chip 106 may be about 6.8 mm by about 2.0 mm. The air bearing surface 128 of the chip 106 has a back edge 156. The distance from the front 132 of the chip 106 to the back edge 156 of the air bearing surface 128 on the chip 106 may be, for example, about 0.63 mm, and in another example could be, for example 0.80 mm. However, other distances could be utilized. The distance from the front 142 to the back 144 of the closure 108 may be, for example, about 0.225 mm.

In the module 100 shown in the illustrated example, the chip 106 has a tail surface 157 that may be substantially parallel to the air bearing surface 128 of the chip 106 and the air bearing surface 110 of the substrate 104. Similarly, the substrate 104 has a tail surface 158 that has a first portion 159 adjoining a rear portion of the first side 166 of the chip receiving slot 126, and a second portion 160 adjoining a rear portion of the second side 168 of the chip receiving slot 126. The tail surface 158 of the substrate 104 is substantially coplanar with the tail surface 157 of the chip 106. The tail surfaces 157, 158 do not have to be parallel to the air bearing surfaces 128, 110. The tail surface 157 of the chip 106 is located between the air bearing surface 128 of the chip 106 and the back 134 of the chip 106, and is located in a plane positioned between the air bearing surface 128 of the chip 106 and the bottom surface 130 of the chip 106. Similarly, the tail surface 158 of the substrate is located between the air bearing surface 110 of the substrate 104 and the back 120 of the substrate 104. The tail surface 157 of the chip 106 and tail surface 158 of the substrate 104 may be formed by a taperless grind operation, discussed below, in which a substantially rectangular rear portion of the composite air bearing surface 102 is removed. The chip tail surface 157 and the substrate tail surface 158 may be, for example, about 0.18 mm from the plane defined by the air bearing surface 128 of the chip 106. The distance from the back 134 of the chip 106 to a front edge 161 of the tail surface 157 of the chip 106, and from the back 120 of the substrate 104 to a front edge 162 of the tail surface 158 of the substrate 104, may be, for example, about 1.75 mm.

As shown most clearly in FIGS. 3-4, the chip receiving slot 126 in the substrate 104 has a front 163 at the front 118 of the substrate 104, a back 164 at the back 120 of the substrate 104, a first side 166, a second side 168, and a bonding surface 170. The chip receiving slot 126 also has a first side trough 172 proximate to the first side 166 of the chip receiving slot 126, and a second side trough 174 proximate to the second side 168 of the chip receiving slot 126. The first side trough 172 has a bottom 176, and the second side trough 174 has a bottom 178. The depth of the chip receiving slot 126 is chosen so that the air bearing surface 128 of the chip 106 will be substantially aligned with the air bearing surface 110 of the substrate 104 over the temperature and humidity ranges to which the module 100 is likely to be exposed, despite expansion or contraction of the adhesive and tolerance variations in the thickness of the chip 106. In the illustrated example, when the chip 106 is placed in the chip receiving slot 126, the back 134 of the chip 106 is aligned with the back 164 of the chip receiving slot 126. However, the chip 106 does not have to extend to the back 164 of the chip receiving slot 126. The length of the chip receiving slot 126 from the first side 166 of the chip receiving slot to the second side 168 of the chip receiving slot 126 may be, for example about 7.0 mm, and, for example, is centered along the 22.5 mm length of the substrate 104. The width of the chip receiving slot 126 from the front 163 of the chip receiving slot 126 to the back 164 of the chip receiving slot 126 may be, for example, about 2.0 mm. The distance from the air bearing surface 110 of the substrate 104 to the bonding surface 170 of the chip receiving slot 126 may be, for example, about 580±15 µm. The distance from the air bearing surface 110 of the substrate 104 to the bottom 176 of the first side trough 172 and to the bottom 178 of the second side trough 174 may be, for example about 0.65 mm.

The first portion 112 of the substrate 104 air bearing surface 110 adjoins the first side 166 of the chip receiving slot 126, and the second portion 114 of the substrate 104 air bearing surface 110 adjoins the second side 168 of the chip receiving slot 126. The chip 106 is inserted in the chip receiving slot 126 in the substrate 104 with the air bearing surface 128 of the chip 106 substantially aligned with the air bearing surface 110 of the substrate 104, and with the back 134 of the chip 106 substantially aligned with the back 120 of the substrate 104.

An adhesive layer 180 (shown most clearly in FIGS. 3 and 4) is attached to the bonding surface 170 of the chip receiving slot 126 and to the bottom surface 130 of the chip 106. As an example, the adhesive layer 180 may be U.V. cured. Additionally, the adhesive layer 180 fills at least a portion of the fist side trough 172 and/or the second side trough 174.

B. Apparatus for Aligning and Bonding a Chip with a Substrate

Figure 5:
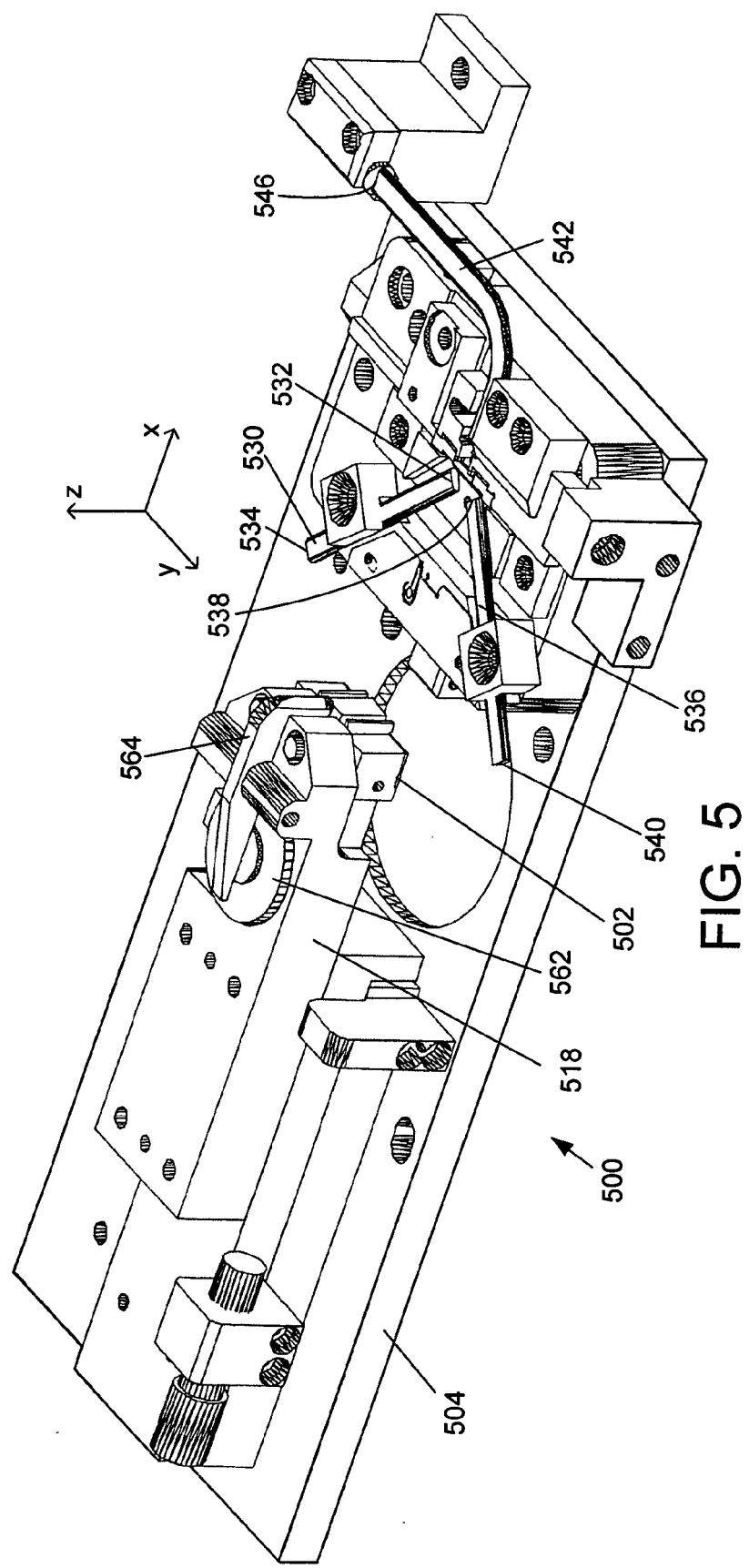
FIG. 5 is a perspective view of an apparatus for aligning and bonding a chip with a substrate in accordance with an example of the invention.
Figure 6:
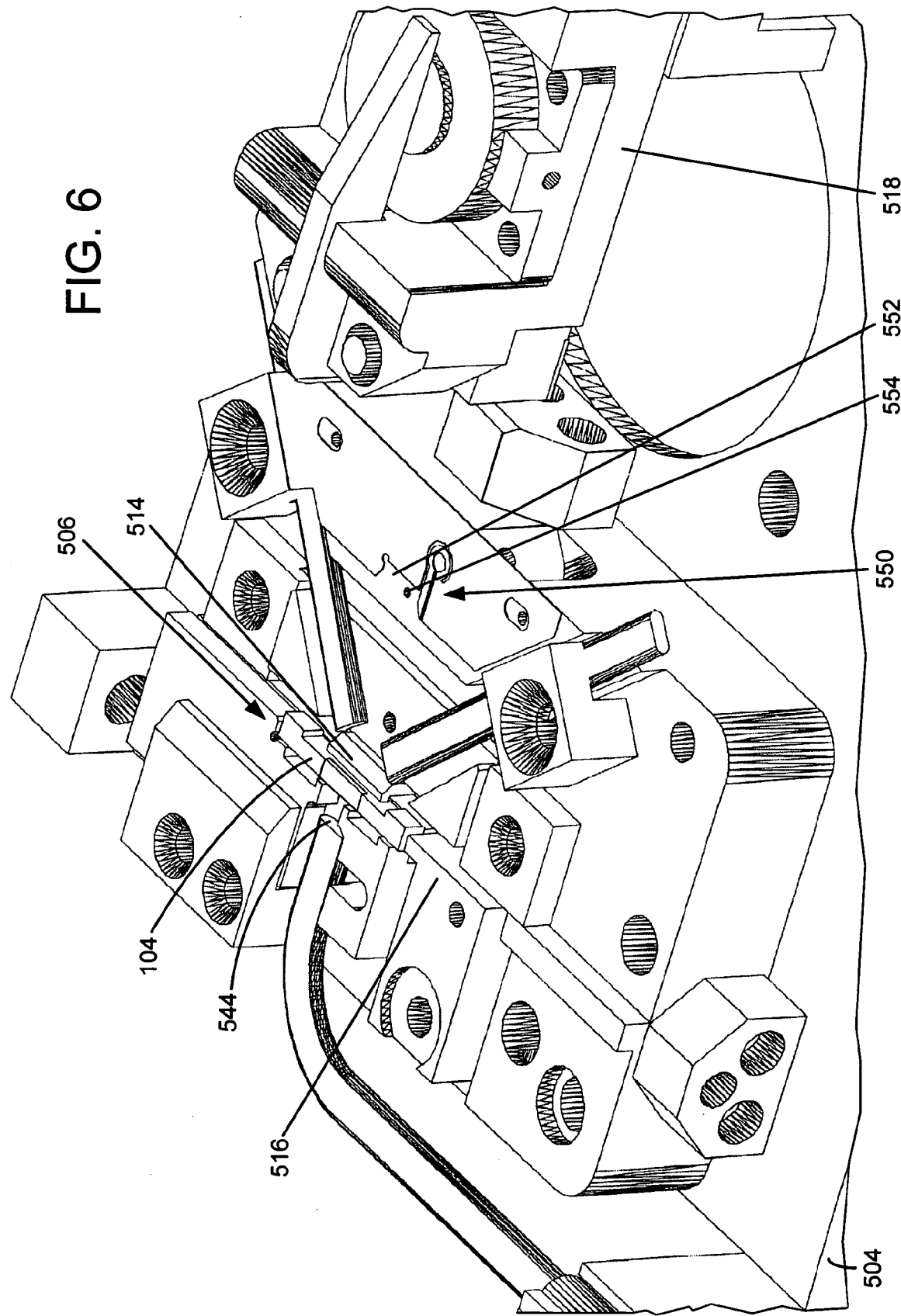
FIG. 6 is a cutaway perspective view of a portion of an apparatus for aligning and bonding a chip with a substrate in accordance with an example of the invention.
Figure 6A:
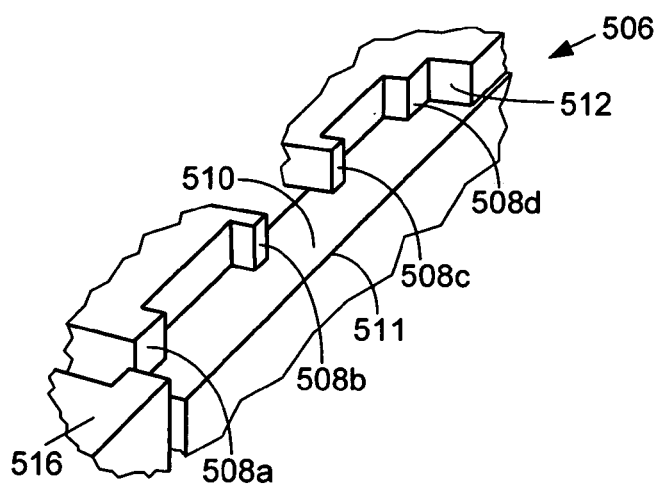
FIG. 6A is another cutaway perspective view of a portion of an apparatus for aligning and bonding a chip with a substrate in accordance with an example of the invention.
Figure 7:
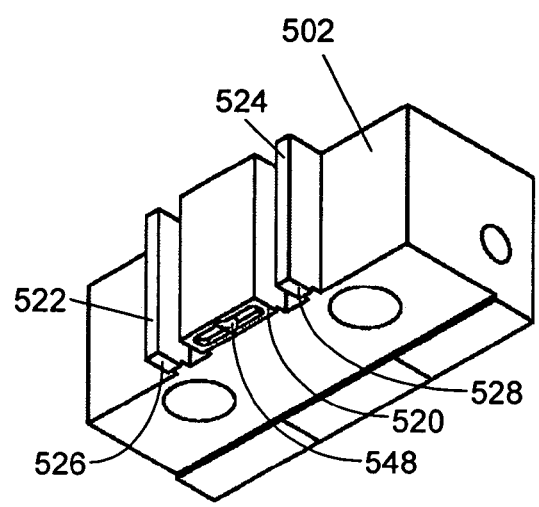
FIG. 7 is a bottom perspective view of a pick-up chuck of an apparatus for aligning and bonding a chip with a substrate, in accordance with an example of the invention.

Another aspect of the invention concerns an apparatus for aligning and bonding a chip 106 with a substrate 104 to form a composite air bearing surface 102. The apparatus may be called a bonding apparatus, a bonding machine, or a fixture. As an example, the apparatus may be embodied by the apparatus 500 shown in FIG. 5. FIG. 5 is a perspective view of the apparatus 500, FIGS. 6 and 6A are cutaway perspective views of portions of the apparatus 500, and FIG. 7 is a bottom perspective view of a pick-up chuck 502 of the apparatus 500. The apparatus 500 includes a housing 504 that has a substrate seat 506 (shown most clearly in FIG. 6A). In FIG. 6 the substrate 104 is shown in the substrate seat 506, and in FIG. 6A the substrate seat 506 is shown without the substrate 104. The substrate seat 506 has back surfaces 508a, 508b, 508c, 508d (which can be called datums or stops), a bottom 510, a front edge 511, and a side 512 (all shown most clearly in FIG. 6A). In alternative embodiments, the substrate seat 506 could have one, two, three, or five or more back surfaces. The apparatus 500 may also include a substrate front clamp 514 (shown most clearly in FIG. 6) slidably mounted on the housing 504 for selectively holding the substrate 104 in the substrate seat 506, and a substrate side clamp 516 (shown most clearly in FIGS. 6 and 6A) slidably mounted on the housing for selectively holding the substrate 104 in the substrate seat 506. The apparatus 500 also includes an alignment arm 518 (shown in FIGS. 5 and 6) slidably attached to the housing 504. The pick-up chuck 502 (shown most clearly in FIGS. 5 and 7) is slidably attached to the alignment arm 518. The pick-up chuck 502 has bottom surface 520 (shown in FIG. 7). A first alignment foot 522, and a second alignment foot 524 (shown in FIG. 7), are attached to the pick-up chuck 502, and protrude from the bottom surface 520 of the pick-up chuck 502. The first alignment foot 522 has a bottom surface 526, and the second alignment foot 524 has a bottom surface 528. In alternative embodiments, more than two alignment feet could be used. For example, four alignment feet could be used.

A first fiber optic U.V. light guide 530 (shown most clearly in FIG. 5) is attached to the housing 504. A first end 532 of the first fiber optic U.V. light guide 530 is located proximate to the front edge 511 of the substrate seat 506 about 2 mm above the bottom 510 of the substrate seat 506. A second end 534 of the first fiber optic U.V. light guide 530 is configured for coupling to a U.V. light source (not shown). Similarly, a second fiber optic U.V. light guide 536 may also be attached to the housing 504. A first end 538 of the second fiber optic U.V. light guide 536 is located proximate to the front edge 511 of the substrate seat 506 about 2 mm above the bottom 510 of the substrate seat 506, and a second end 540 of the second fiber optic U.V. light guide 536 is configured for coupling to the U.V. light source. A third fiber optic U.V. light guide 542 may also be attached to the housing 504. A first end 544 of the third fiber optic U.V. light guide 542 is located proximate to the back surfaces 508b, 508c of the substrate seat 506, and a second end 546 of the third fiber optic U.V. light guide 542 is configured for coupling to the U.V. light source. The U.V. light guides may also be called wands.

The bottom surface 520 (shown in FIG. 7) of the pick-up chuck 502 may have a hole 548 for coupling to a vacuum source (not shown) for holding the air bearing surface 128 of the chip 106 against the bottom surface 520 of the pick-up chuck 502. Additionally, a chip seat 550 (shown most clearly in FIG. 6) that has a slot 552 for receiving the chip 106, may be formed in the housing 504, for aligning the chip 106 in a y direction (which may also be referred to as a first direction) and for holding the chip 106 before it is picked up by the pick-up chuck 502. The chip seat 550 may have a hole 554 for coupling to the vacuum source, for holding the chip 106 on the chip seat 550.

Figure 8:
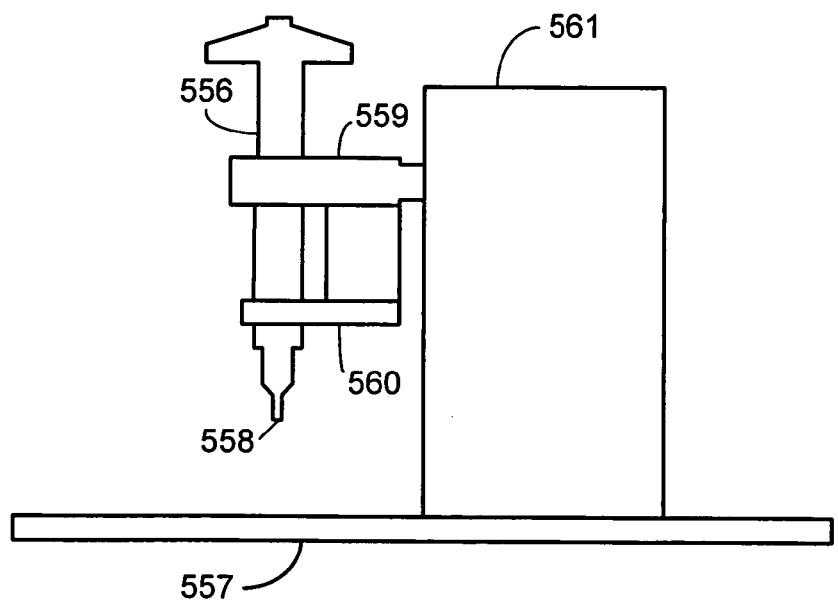
FIG. 8 is a side view of an adhesive dispenser attached to a base in accordance with an example of the invention.

The apparatus 500 may also include an adhesive dispenser 556 and a base 557, which are shown in FIG. 8. The base 557 may be attached to the housing 504. The adhesive dispenser 556 has a hole 558 (which may also be called an opening), for dispensing adhesive. The adhesive dispenser 556 is attached to a first dispenser holder arm 559, and a second dispenser holder arm 560, which are attached to a dispenser stand 561. The adhesive dispenser 556 may be selectively coupled to an air pressure source (not shown) for pushing the adhesive out of the hole 558 of the adhesive dispenser 556. As an example, an air tube (not shown) may be coupled to the adhesive dispenser for supplying air pressure from an air pressure source for pushing the adhesive out of the hole 558. The adhesive dispenser may 556 be attached to actuators (not shown) for moving the hole 558 in the adhesive dispenser 556 over the chip receiving slot 126 in the substrate 104 to deposit adhesive in the chip receiving slot 126. As an example, three electrical actuators may be attached to the dispenser stand 561 for moving the adhesive dispenser 556 in x, y, and z directions. The x direction may be referred to as a second direction, the y direction may be referred to as a first direction, and the z direction may be referred to as a third direction.

Movement of the alignment arm 518 may be accomplished, for example, by coupling an air pressure source to a cylinder (not shown) attached to, or formed in, the alignment arm 518. As an example, a tube may be used to couple air from an air compressor to the cylinder. Air pressure may be applied to one side of the cylinder to move the cylinder and the alignment arm 518 in a first direction, and may be applied to an opposite side of the cylinder to move the cylinder and the alignment arm 518 in an opposite direction. The substrate front clamp 514 and the substrate side clamp 516 may, for example, be moved in a similar fashion with air pressure. Bearings (not shown) may be utilized to facilitate smooth movement of the alignment arm 518. Vertical movement of the pick-up chuck 502 may be accomplished, for example, with an air bladder 562 coupled to the pick-up chuck 502 with a pivot arm 564. The air bladder 562 may be coupled to an air pressure source (not shown) for inflating and deflating the air bladder 562. For example, the pick-up chuck 502 may be moved downward by putting air into the air bladder 562, and may be moved upward by removing air from the air bladder 562. Air lines, valves, switches, manifolds, and pressure regulators (not shown), may be utilized to couple the air pressure source (or air pressure sources) to the alignment arm 518, the bladder 562, the substrate front clamp 514, the substrate side clamp 517, the hole 548 in the bottom surface 520 of the pick-up chuck 502, the hole 554 in the chip seat 550, and to the adhesive dispenser 556. The air pressure source may, for example, provide positive air pressure and/or negative air pressure (to create a vacuum source). A processor, for example a portable computer, may be coupled to the air pressure source, valves, and actuators for controlling operation of the apparatus 500. Alternatively, electric actuators could be used to move the alignment arm 518, the pick-up chuck 502, the substrate front clamp 514, and the substrate side clamp 516.

Alignment of the plane of the air bearing surface 128 of the chip 106 with the plane of the air bearing surface 110 of the substrate 104 is accomplished mechanically with the apparatus 500, by having a portion of the apparatus 500 touch the air bearing surface 110 of the substrate 104 at specified locations to stop vertical motion of the chip 106, as is discussed below. To maintain optimal performance, the fixture 500 could be periodically realigned, and a mechanized (or manual) fixture cleaning process could be used to clean the fixture 500 between uses.

II. Operation

In addition to the various hardware embodiments described above, another aspect of the invention concerns a method for embedding a chip in a substrate, to form a composite air bearing surface, which may be used in a tape head. Embedding the chip in the substrate may also be referred to as merging the chip with the substrate.

Overall Sequence of Operation

Figure 9A:
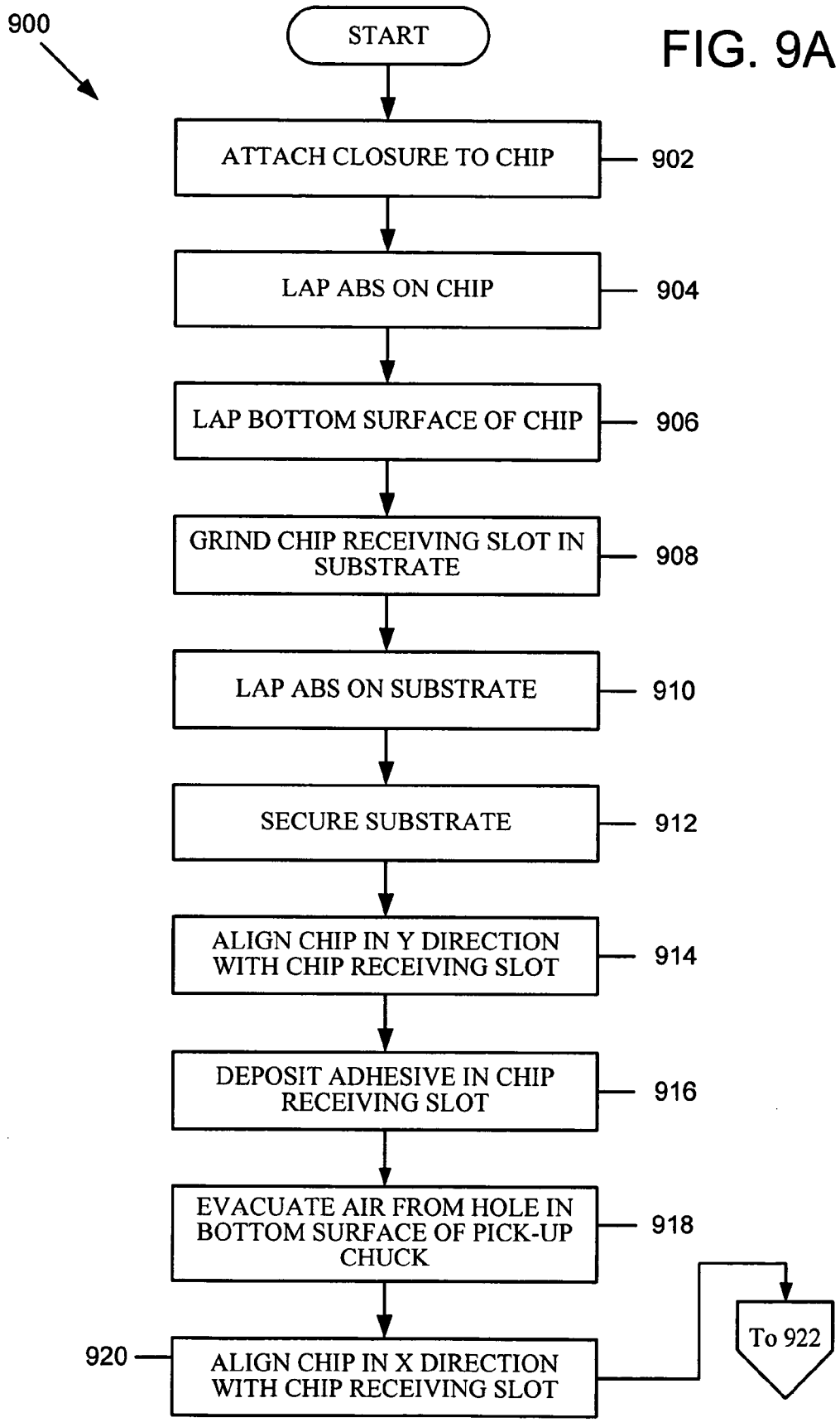
FIGS. 9A and 9B are a flowchart of an operational sequence for embedding a chip in a substrate to form a composite air bearing surface in accordance with an example of the invention.
Figure 9B:
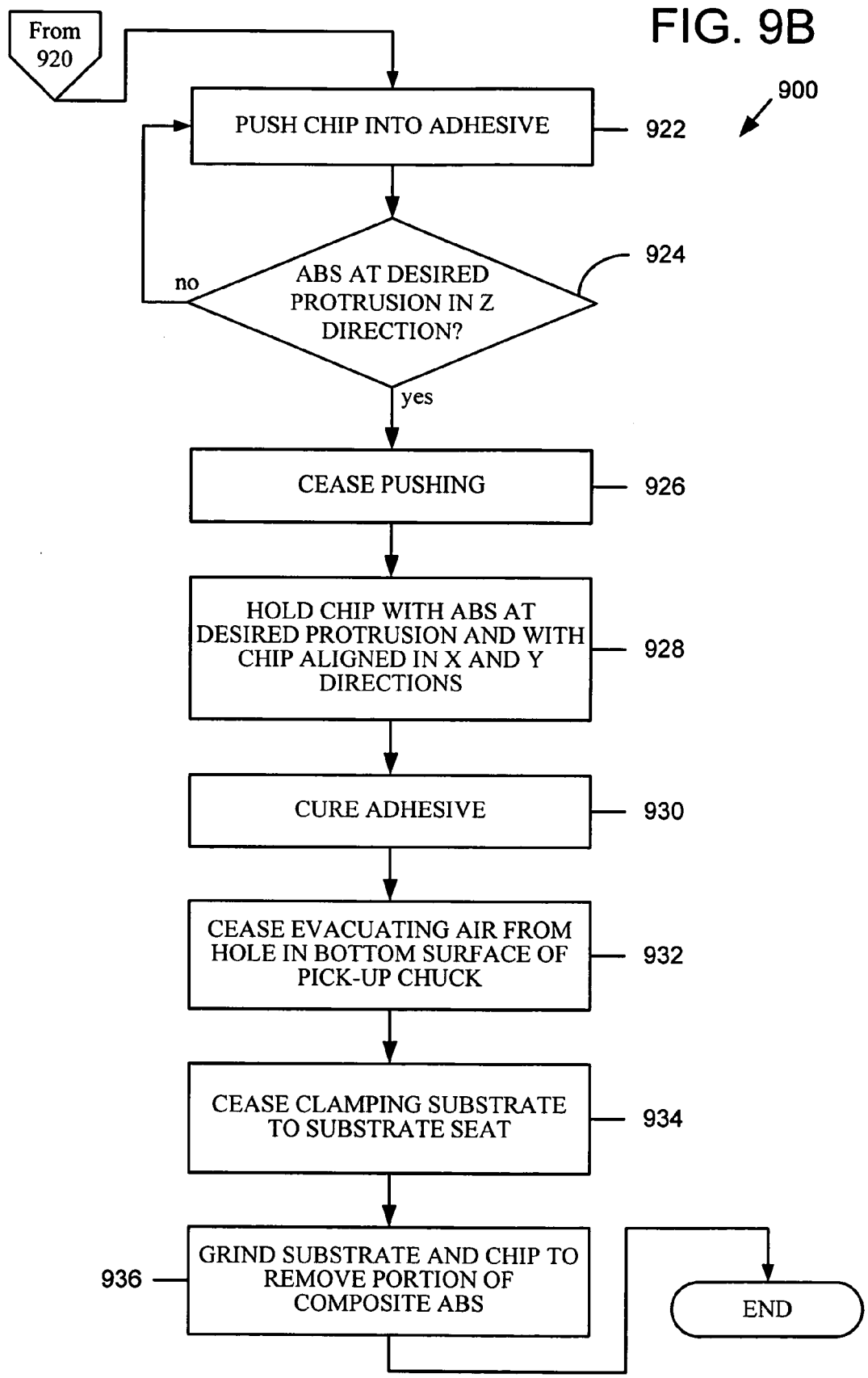

For ease of explanation, but without any intended limitation, the method aspect of the invention is described with reference to the read/write module 100 and the apparatus 500 described above. An example of the method aspect of the present invention is illustrated in FIGS. 9A and 9B, which show a sequence 900 for a method for embedding a chip 106 in a substrate 104 to form a composite air bearing surface 102.

The sequence 900, may begin with the operation 902 of attaching a closure 108 to the chip 106, adjacent the active elements 140 in the chip 106. The closure 108 is attached to the front 132 of the chip. However, the closure 108, which is included for example to reduce tape wear on the active elements 140, is not required. The sequence 900 may also include the operation 904 of lapping the chip 106 to form the air bearing surface 128 on the chip 106, prior to performing the aligning operation 914 discussed below. The sequence 900 may further include lapping the bottom surface 130 of the chip 106, in operation 906, to produce sufficient surface roughness on the bottom surface 130 to increase adhesive reliability and bond strength (discussed below). Operation 908 may also be performed, which comprises grinding the chip receiving slot 126 in the substrate 104, prior to the operation 916 of depositing adhesive in the chip receiving slot 126, which is discussed below. The sequence 900 may also include the operation 910 of lapping the substrate 104 to form the air bearing surface 110 on the substrate 104, also prior to the operation 916 of depositing adhesive in the chip receiving slot 126, discussed below. As an example, the air bearing surface 110 of the substrate 104 may be lapped after the chip receiving slot 126 is ground in the substrate 104, to avoid distortion of the air bearing surface 110 that could result if the chip receiving slot 126 is ground in the substrate 104 after the air bearing surface 110 of the substrate 104 is lapped. In one example the air bearing surface 110 of the substrate 104 is polished to the same Ra as the air bearing surface 128 of the chip 106, which may be, for example about 50 Å Ra.

In operation 912, the substrate 104 is secured in a fixed position. As an example, the substrate 104 may be secured in the substrate seat 506 by pressing the substrate front clamp 514 and/or the substrate side clamp 516 against the substrate, thereby causing the substrate 104 to be pushed against the back surfaces 508a, 508b, 508c, 508d and the side 512 of the substrate seat 506. In some embodiments there may be a hole (not shown) in the bottom 510 of the substrate seat 506, and air may be evacuated from the hole to hold the bottom 116 of the substrate 104 against the bottom 510 of the substrate seat 506. A vacuum source could be coupled to the hole to evacuate air from the hole.

The sequence 900 also includes operation 914, which comprises aligning the chip 106 in a y direction (also called the first direction) with the chip receiving slot 126 in the substrate 104. The operation 914 of aligning the chip 106 in the y direction may be performed before or after the operation 916 of depositing adhesive (discussed below). The chip 106 is aligned in the y direction with the chip receiving slot 126 when the distance from the first side 136 of the chip 106 to the first side 166 of the chip receiving slot 126, and the distance from the second side 138 of the chip 106 to the second side 168 of the chip receiving slot, are about the same. Because the distance from the first side 136 to the second side 138 of the chip 106 is slightly less than the distance from the first side 166 to the second side 168 of the chip receiving slot 126, the chip 106 will fit into the chip receiving slot 126 when the chip 106 is later pushed into adhesive in the chip receiving slot 126 (in operation 922 discussed below). As an example, the chip 106 may be aligned in the y direction by placing the chip 106 in the slot 552 in the chip seat 550. The slot 552 is sized and positioned so that when the chip 106 is placed in the slot 552, the first side 136 of the chip 106 is about 0.1 mm towards the center of the chip receiving slot 126 in the y direction from the first side 166 of the chip receiving slot 126, and the second side 138 of the chip 106 is about 0.1 mm towards the center of the chip receiving slot 126 in the y direction from the second side 168 of the chip receiving slot 126. The chip 106 may be held in position in the slot 552 by coupling the hole 554 in the chip seat 550 to a vacuum source to evacuate air from the hole 554 in the chip seat 550.

In operation 916, adhesive is deposited in the chip receiving slot 126 in the substrate 104. Operation 916 may be accomplished by applying pressure to adhesive in the adhesive dispenser 556 to cause adhesive to flow from the hole 558 in the adhesive dispenser 556, and by moving the hole 558 in the adhesive dispenser 556 over the chip receiving slot 126 while adhesive flows from the hole 556. In one example the adhesive is deposited at least 5 microns thick on the bonding surface 170 of the chip receiving slot 126. However, smaller or larger adhesive thicknesses could be used. In some embodiments the adhesive may be a U.V. curable cyanoacrylate. However, the adhesive does not have to be U.V. curable. Also, the adhesive does not have to be a cyanoacrylate. In one example the adhesive may be part number 4303 manufactured by Loctite Corporation. Loctite 4303 does not require pressing together the parts that are to be bonded. Other adhesives available from Loctite Corporation, for example model numbers 4302 or 4205, or adhesives available from other sources, could also possibly be used. In an alternative embodiment, a U.V. curable adhesive could be placed only near the four corners of the bonding surface 170 of the chip receiving slot 126 to hold the chip 106 in place, and then later a stronger adhesive could be added between the bottom surface 130 of the chip 106 and the bonding surface 170 of the chip receiving slot 126 to increase the bond strength and reliability.

The humidity characteristics of the adhesive affect the functionality and reliability of the module 100. Adhesives generally shrink when cured, and swell when subjected to humidity. The amount of adhesive expansion due to humidity is greater if there is more adhesive thickness. The adsorption of moisture with exposure to elevated temperatures and humidities is low for Loctite 4303, and is between 0.25% and 0.78% by weight. Loctite 4303 was measured to exhibit low humidity expansion of 0.035 mm/mm at 35° C., 95% R.H. (relative humidity). The adsorbed water causes expansion of the adhesive, which increases the protrusion of the air bearing surface 128 of the chip 106, by 3.5±0.4% of the adhesive thickness. For a 60 µm thick adhesive, the expansion would be 2.1±0.2 µm. Adhesive expansion can also degrade the cohesive strength of the adhesive. Additionally, moisture may diffuse along the interface between the adhesive and the substrate 104 and/or the chip 106, potentially degrading the adhesive bond strength. The humidity properties of the adhesive are of interest because the module 100 is subjected to water if the taperless grind operation 936, discussed below, is performed. Furthermore, tape heads used in the data storage industry are also exposed to variations in ambient environmental conditions, which include humidity and temperature variations.

The strength of the bond between the substrate 104 and the chip 106 is another important characteristic that affects the functionality and reliability of the module 100. The break force of the bond between the substrate 104 and the chip 106 ideally should be sufficiently large to prevent (or minimize) movement or degradation of the bond during processing of the module 100 and when the module 100 is exposed to environmental conditions over the life of the module 100, for example humidity and temperature variations. It is desirable to have a tight distribution of the break force for modules 100 produced in accordance with the invention. The break force may be measured, for example, by holding the substrate 104 fixed while applying a pseudo-shear force to the chip 106 until the bond breaks.

The bottom surface 130 of the chip 106 and the bonding surface 170 of the chip insertion slot 126 may be made sufficiently rough to improve the bond strength and humidity properties of the bond. Generally, the bottom surface 130 of the chip 106 is lapped to make as rough of a surface as can be produced without causing excessive wear on the chip 106 or excessive bowing of the chip air bearing surface 128. The bond strength may be improved by lapping the bottom surface 130 of the chip 106, for example, with a 6 µm diamond paste to produce a surface roughness between about 70 Å Ra and about 205 Å Ra, with an average of about 130 Å Ra. As another example, the bond strength may also be improved by lapping the bonding surface 170 of the chip insertion slot 126 to yield a surface roughness of N5-N6, which is 0.8 µm Ra to 1.6 µm Ra.

The sequence 900 may also include the operation 918 of evacuating air from the hole 548 in the bottom surface 520 of the pick-up chuck 502, to pick up the chip 106 and hold the air bearing surface 128 of the chip 106 against the bottom surface 520 of the pick-up chuck 502. The chip 106 may be picked up by the pick-up chuck 502 to facilitate moving the chip 106 by moving the alignment arm 518. The alignment arm 518 may be moved in an x direction (also called the second direction) to align the chip 106 in the x direction with the chip receiving slot 126 in the substrate 104, in operation 920 (discussed below). The chip 106 may be held against the pick-up chuck until the U.V. curing (discussed below) is completed. To evacuate air from the hole 548, a vacuum source (not shown) may be coupled to the hole 548 with a tube (not shown). The vacuum source may be the same vacuum source, or a different vacuum source than the vacuum source used for evacuating air from the hole 554 in the chip seat 550. To facilitate picking up the chip 106 with the pick-up chuck 502, the vacuum source may be decoupled from the hole 554 in the chip seat 550 prior to when the chip 106 is picked up by the pick-up chuck 502. The chip 106 remains aligned in the y direction when it is picked up by the pick-up chuck 502 on the alignment arm 518.

In operation 920 the chip 106 is aligned in the x direction with the chip receiving slot 126 in the substrate 104. The chip 106 may be aligned in the x direction with the chip receiving slot 126 in the substrate 104 by substantially aligning the back 134 of chip 106 with the back 120 of the substrate 104, or, by substantially aligning the front 133 of the air bearing surface 128 of the chip 106 with the front 163 of the chip receiving slot 126. For example, the chip 106 may be aligned with the substrate 104 in the x direction by picking up the chip 106 with the pick-up chuck 502, and then moving the pick-up chuck 502 and the chip 106 over the substrate 104 until the back 134 of the chip 106 touches the back surfaces 508b, 508c of the substrate seat 506. Because the substrate 104 has been secured to the substrate seat 506 in operation 912, the back 120 of the substrate 104 also is touching the back surfaces 508b, 508c (and back surfaces 508a, 508d) of the substrate seat 506.

The sequence 900 also includes the operation 922 of pushing the chip 106 into the adhesive in the chip receiving slot 126 of the substrate 104. The pushing operation 922 may be accomplished by lowering the pick-up chuck 502, while holding the chip 106 on the bottom surface 520 of the pick-up chuck 502, with the air bearing surface 128 of the chip 106 substantially parallel with the air bearing surface 110 of the substrate 104. As an example, in the pushing operation 922 the chip 106 is pushed into the adhesive only in the negative z direction. The pushing operation 922 may also include pushing a portion of the adhesive into a plurality of troughs 172, 174 in the chip receiving slot 126 in the substrate 104. The adhesive may be pushed into the plurality of troughs 172, 174 by the bottom surface 130 of the chip 106 as the chip 106 is pushed into the adhesive. The plurality of troughs 172, 174 are provided so that excessive adhesive will flow into the troughs 172, 174 rather than on to the composite air bearing surface 102.

The sequence 900 further includes the operation 924 of detecting when the air bearing surface 128 of the chip 106 is substantially at a desired protrusion in the z direction in relation to the air bearing surface 110 of the substrate 104. The z direction may also be referred to as the third direction. The z direction is perpendicular to the air bearing surface 110 of the substrate 104, and the desired protrusion of the air bearing surface 128 of the chip 106 can be a negative, positive, or zero value with reference to the air bearing surface 110 of the substrate 104. The detecting operation 924 may be accomplished by detecting when the bottom surface 526 of the first alignment foot 522 and the bottom surface 528 of the second alignment foot 524 contact the air bearing surface 110 of the substrate 104. The air bearing surface 110 of the substrate 104 is used as a datum for determining when the air bearing surface 128 of the chip 106 is at the desired protrusion in the z direction. The distance that the first alignment foot 522 and the second alignment foot 524 extend from the bottom surface 520 of the pick-up chuck 502 is chosen so that the bottom surface 526 of the first alignment foot 522 and the bottom surface 528 of the second alignment foot 524 will contact the air bearing surface 110 of the substrate 104 when the air bearing surface 128 of the chip 106 is substantially at the desired protrusion in the z direction.

In operation 926, responsive to detecting that the air bearing surface 128 of the chip 106 is substantially at the desired protrusion in the z direction in relation to the air bearing surface 110 of the substrate 104, pushing the chip 106 into the adhesive is ceased. When the bottom surface 526 of the first alignment foot 522 and the bottom surface 528 of the second alignment foot 524 contact the air bearing surface 110 of the substrate 104, the first alignment foot 522 and the second alignment foot 524 prevent the pick-up chuck 502 from lowering any further, thereby preventing the chip 106 from being pushed any further into the adhesive.

The protrusion of the air bearing surface 128 of the chip 106 in relation to the air bearing surface 110 of the substrate 104 is an important parameter concerning the performance and reliability of the module 100. The initial protrusion is affected by the dimensional tolerances of the parts and the alignment of the chip 106 in the chip receiving slot 126 in the substrate 104. Long term changes in the protrusion are caused primarily by temperature and humidity effects. In order to be able to read and write to tape in accordance with desired performance characteristics of the module 100, the air bearing surface 128 of the chip 106 must be aligned with the air bearing surface 110 of the substrate 104 within a protrusion tolerance dictated by the desired performance characteristics of the module 100. For example, there is generally no increase in read and write data error rates when the air bearing surface 128 of the chip 106 is aligned between about −4 μm and about +11 μm from the air bearing surface 110 of the substrate 104. A negative number (such as −4 μm) indicates that the air bearing surface 128 of the chip 106 is lower than the air bearing surface 110 of the substrate 104, and a positive number (such as +11 μm) indicates that the air bearing surface 128 of the chip 106 is higher than the air bearing surface 110 of the substrate 104). Too low of a protrusion (wherein the air bearing surface 128 of the chip 106 is below the air bearing surface 110 of the substrate 104) may result in a reduction and/or loss of servo, reader, and writer signals in the module due to Wallace spacing losses. Too high of a protrusion (wherein the air bearing surface 128 of the chip 106 is above the air bearing surface 110 of the substrate 104) may cause excessive tape wear or damage or loss of servo signals. Generally, the air bearing surfaces 128, 110 are substantially aligned when the air bearing surface 128 of the chip 106 is aligned in the z direction to within about −4 μm and about +11 μm from the air bearing surface 110 of the substrate 104.

As an example, the air bearing surface 128 of the chip 106 is at the desired protrusion in the z direction when the air bearing surface 128 of the chip 106 is about 2 microns above the air bearing surface 110 of the substrate 104. In this example, the air bearing surface 128 of the chip 106 is positioned 2 microns above the air bearing surface 110 of the substrate 104 to allow for possible lowering of the air bearing surface 128 of the chip 106 as the adhesive continues to cure after being initially cured with U.V. light. However, the desired protrusion of the air bearing surface 128 of the chip 106 in the z direction could be greater or lesser than 2 microns above the air bearing surface 110 of the substrate 104, or below the air bearing surface 110 of the substrate 104, or when the air bearing surfaces 128, 110 are coplanar. Lapping of the combined air bearing surface 102, which may be costly, is not required because the invention permits precisely positioning the chip 106 in the substrate 104 to produce the desired protrusion.

The protrusion of the air bearing surface 128 of the chip 106 in relation to the air bearing surface 110 of the substrate may be designated P2 at the first front corner 139a (shown in FIG. 2) of the chip 106, may be designated P3 at the second front corner 139b of the chip 106, may be designed P1 at the first back corner 139c of the chip 106, and may be designated P4 at the second back corner 139d of the chip 106. The protrusions P2 and P3 at the front corners 139a-b, are more important than the protrusions P1 and P4 at the back corners 139c-d, because the back corners 139c-d may later be removed from the composite air bearing surface 102 by a taperless grind operation (discussed below). If desired, a laser interferometer (which, for example, may be obtained from Zygo Corporation) may be used to measure protrusion tolerances. However, it is not necessary to measure tolerances when the air bearing surface 110 of the substrate 104 is used as a datum (reference surface) for detecting when the air bearing surface 128 of the chip 106 is at the desired protrusion in the z direction, because the desired protrusion exists when the first alignment foot 522 and the second alignment foot 524 contact the air bearing surface 110 of the substrate 104. Using the datum may be quicker than individually measuring the protrusions P1, P2, P3, and P4, and adjusting the position of the chip 106.

The sequence 900 may also include operation 928, which comprises holding the chip 106, with the air bearing surface 128 of the chip 106 substantially at the desired protrusion in the z direction in relation to the air bearing surface 110 of the substrate 104, and with the chip 106 substantially aligned in the x and y directions with the chip receiving slot 126 in the substrate 104. Due to the orientation of the bottom surface 520 of the pick-up chuck 502, during the holding operation 928 the air bearing surface 128 of the chip 106 is substantially parallel with the air bearing surface 110 of the substrate 104. In operation 930 the adhesive is cured to bond the bottom surface 130 of the chip 106 to the bonding surface 170 of the chip receiving slot 126 in the substrate 104, with the air bearing surface 128 of the chip 106 substantially at the desired protrusion in the z direction in relation to the air bearing surface 110 of the substrate 104, and with the chip 106 substantially aligned in the x and y directions with the chip receiving slot 126 in the substrate 104. The chip 106 is held firmly during the curing operation 930 to prevent the adhesive from pulling the chip 106 downward when the adhesive shrinks as it is cured, and to keep the air bearing surface 128 of the chip 106 parallel with the air bearing surface 110 of the substrate 104.

The curing operation 930 may comprise shining at least one U.V. light source on the adhesive for a prescribed period of time, for example 15 seconds. As an example, the U.V. light source may use a 200 watt U.V. lamp (not shown) that has adjustable intensity. The light energy output at the end of a U.V. light guide, for example, the first end 532 of the first fiber optic U.V. light guide 530, may be for example, about one-fifth of the light energy from the U.V. lamp. The optimal U.V. light intensity is a function of the type of adhesive used, and is adjusted to not be so high as to burn the outer surface of the adhesive, but to be high enough to penetrate into the adhesive. The exposure time may be adjusted to be longer or shorter than 15 seconds. Applying U.V. light of the desired intensity for the prescribed time period quickly achieves bonding and fixes the location of the chip 106, but for many adhesives (such as Loctite 4303 adhesive), will not fully cure the adhesive. Bond strength generally increases with time for at least 30 days. After the U.V. curing, the adhesive thickness between the bonding surface 170 of the chip receiving slot 126 and the bottom surface 130 of the chip 106 may vary, for example, from about 5 μm to about 60 μm, with a nominal thickness of about 30 μm, due to manufacturing tolerances of the substrate 104 and the chip 106.

As an example, the curing operation 930 may include shining at least a first U.V. light source on the adhesive proximate to the front 132 of the chip 106 for the prescribed period of time, and shining at least a second U.V. light source on the adhesive proximate to the back 134 of the chip 106 for the prescribed period of time. In one example, U.V. light from the first end 532 of the first fiber optic U.V. light guide 530 and U.V. light from the first end 538 of the second fiber optic U.V. light guide 536 are shined on the adhesive proximate to the front 132 of the chip 106 for the prescribed period of time, and U.V. light from the first end 544 of the third fiber optic U.V. light guide 542 is shined on the adhesive proximate to the back 134 of the chip 106 for the prescribed period of time.

In an alternative embodiment, the curing operation 930 also includes heating the adhesive, at a temperature and for a time period suitable for the adhesive, to further cure the adhesive. As an example, the module 100 may be placed in an oven to further cure the adhesive. The temperature used for heating the adhesive and the duration of the heating may be chosen to achieve a desired bond strength while avoiding degradation of any other adhesive bonds (for example, the bond between the chip 106 and the closure 108). As an example, the temperature used for heating the adhesive may be from about 50° C. to about 80° C., and the duration of the heating may be from about 1 hour to about 48 hours. The heating temperature may be determined based on characteristics of the adhesive. Although heating the adhesive may be performed as part of the curing operation 930, in other alternative embodiments heating of the adhesive may be performed in an additional curing operation, that for example, could be performed after the grinding operation 936 (discussed below). Adhesive and process characteristics may be considered to determine whether it is desirable to perform heat curing, and to determine whether to perform heat curing as part of the curing operation 930 and/or as part of an additional later curing operation. In another alternative embodiment, the curing operation 930 further includes air and/or anerobic curing of the adhesive. Depending on the extent of the curing performed in the curing operation 930, the adhesive may be partially cured, or substantially totally cured, after the curing operation 930.

After the curing operation 930, the sequence 900 may also include the operation 932 of ceasing evacuating air from the hole 548 in the bottom surface 520 of the pick-up chuck 502, to release the chip 106 from the pick-up chuck 502. Also after the curing operation 930, the sequence 900 may additionally include the operation 934 of ceasing clamping the substrate 104 in the substrate seat 506, for example by ceasing pressing the substrate front clamp 514 and the substrate side clamp 516 against the substrate 104.

After the curing operation 930, (and after releasing the module 100 from the substrate seat 506 and the pick-up chuck 502), the sequence 900 may also include the operation 936 of grinding the substrate 104 and the chip 106 to remove a rear portion of the composite air bearing surface 102 that includes the portion of the composite air bearing surface 102 that is above the back 120 of the substrate 104. The portion of the composite air bearing surface 102 that is removed may be, for example, substantially rectangular. This operation 936 may be referred to as a taperless grind operation. (However, the surface produced by the grind does not have to be taperless.) More specifically, the taperless grind operation 936 comprises grinding off a portion of the air bearing surfaces 110, 128 of the substrate 104 and the chip 106, to produce the tail surface 157 of the chip 106, and the tail surface 158 of the substrate 104. The tail surface 157 of the chip 106 and the tail surface 158 of the substrate 104 are substantially coplanar. The portion that is ground off may be, for example, about 22.5 mm long from the first side 122 of the substrate 104 to the second side 124 of the substrate 104, by about 1.75 mm wide (from the back 120 of the substrate 104 to the front edge 162 of the tail surface of the substrate 104, and from the back 134 of the chip 106 to the front edge 161 of the tail surface of the chip 106), by about 180 μm deep (from the air bearing surface 110 of the substrate 104 to the tail surface 158 of the substrate 104).

After the chip 106 and substrate 104 have been bonded and are partially cured via U.V. exposure, they may sit at ambient conditions, (for example, ~20° C. and <30% R.H.), for a period of time, for example 24 hours, prior to the taperless grind operation 936. During the taperless grind operation 936, the module 100 is exposed to water in a liquid coolant. The water in the coolant can affect the bond strength and can also cause adhesive swelling that results from adsorption of the liquid by the adhesive. After the taperless grind operation 936, the bond strength may drop, for example, by about 40%, and the standard deviation of the bond strength may increase, for example, by about 38%. Additionally, after the taperless grind operation 936, the protrusion of the air bearing surface 128 of the chip 106 may increase, for example, on average about 0.9 μm. Also, it is possible for some bonds to fail due to motion during the taperless grind operation 936. In some embodiments, to reduce the number of bonds that fail during the taperless grind operation 936, additional U.V. curing, or heat curing, may be performed prior to performing the taperless grind operation 936.

III. Other Embodiments

While the foregoing disclosure shows a number of illustrative embodiments of the invention, it will be apparent to those skilled in the art that various changes and modifications can be made herein without departing from the scope of the invention as defined by the appended claims. Furthermore, although elements of the invention may be described or claimed in the singular, the plural is contemplated unless limitation to the singular is explicitly stated.

What is claimed is:

1. A tape head read/write module having a composite air bearing surface, the module comprising:
    a substrate having an air bearing surface, a front, a back, and a chip receiving slot, wherein the chip receiving slot has a front at the front of the substrate, a back at the back of the substrate, a first side, a second side, and a bonding surface, and wherein the air bearing surface of the substrate has a first portion adjoining the first side of the chip receiving slot, and a second portion adjoining the second side of the chip receiving slot; and
    a chip that has an air bearing surface, a bottom surface, a front, a back, and active elements, wherein the active elements are located proximate to the front of the chip, and wherein the chip is inserted in the chip receiving slot in the substrate with the air bearing surface of the chip substantially aligned with the air bearing surface of the substrate;
    wherein the chip has a tail surface that is substantially parallel to the air bearing surface of the chip, wherein the tail surface of the chip is located between the air bearing surface of the chip and the back of the chip, and wherein the tail surface of the chip is located in a plane positioned between the air bearing surface of the chip and the bottom surface of the chip; and
    wherein the substrate has a tail surface that is substantially coplanar with the tail surface of the chip, wherein the tail surface of the substrate is located between the air bearing surface of the substrate and the back of the substrate, and wherein the tail surface of the substrate has a first portion adjoining a rear portion of the first side of the chip receiving slot, and wherein the tail surface of the substrate has a second portion adjoining a rear portion of the second side of the chip receiving slot.

2. The module of claim 1 further comprising a U.V. cured adhesive layer attached to the bonding surface of the chip receiving slot and the bottom surface of the chip.

3. The module of claim 2:
    wherein the chip receiving slot in the substrate has a first side trough proximate to the first side of the chip receiving slot and a second side trough proximate to the second side of the chip receiving slot; and
    wherein the adhesive layer fills at least a portion of the fist side trough and the second side trough.

4. The module of claim 1, wherein the air bearing surface of the chip is smoother than the bottom surface of the chip, and wherein the air bearing surface of the substrate is smoother than the bonding surface of the chip receiving slot in the substrate.

5. The module of claim 1, wherein the bonding surface of the chip receiving slot has four corners, and further comprising a U.V. curable adhesive placed proximate the four corners of the bonding surface of the chip receiving slot.

6. A tape head read/write module having a composite air bearing surface, the module comprising:
    a substrate having an air bearing surface, a front, a back, and a chip receiving slot, wherein the chip receiving slot has a front at the front of the substrate, a back at the back of the substrate, a first side, a second side, a bonding surface, a first side trough proximate to the first side of the chip receiving slot, and a second side trough proximate to the second side of the chip receiving slot, and wherein the air bearing surface of the substrate has a first portion adjoining the first side of the chip receiving slot, and a second portion adjoining the second side of the chip receiving slot;
    a chip that has an air bearing surface, a bottom surface, a front, a back, and active elements, wherein the active elements are located proximate to the front of the chip, and wherein the chip is inserted in the chip receiving slot in the substrate with the air bearing surface of the chip substantially aligned with the air bearing surface of the substrate; and
    a U.V. cured adhesive layer attached to the bonding surface of the chip receiving slot and the bottom surface of the chip, wherein the adhesive layer fills at least a portion of the fist side trough of the chip receiving slot and at least a portion of the second side trough of the chip receiving slot.

7. The module of claim 6, wherein the air bearing surface of the chip has a front between the front of the chip and the back of the chip.

8. The module of claim 6:
    wherein the active elements have a surface defining the front of the chip, and wherein the active elements are contiguous with the front of the air bearing surface of the chip,
    and further comprising a closure that has a back that is attached to the front of the chip, and wherein the closure has an air bearing surface that is coplanar with the air bearing surface of the substrate and the air bearing surface of the chip.

9. The module of claim 6, wherein the substrate and the chip are made substantially of N58 AlTiC.

10. The module of claim 6, wherein the face of the chip includes a plurality of pads.

11. The module of claim 6, wherein the closure has a front, and wherein the substrate has a first front protrusion that has a face and a second front protrusion that has a face, wherein the face of the first front protrusion and the face of the second front protrusion are substantially parallel with the front of the substrate and the front of the closure.

12. The module of claim 6, wherein the chip has a first side and a second side, and wherein the length of the chip from the first side of the chip to the second side of the chip is about 6.8 mm, and wherein the thickness of the chip from the bottom surface of the chip to the air bearing surface of the chip is about 550 μm, and wherein the distance from the front to the back of the chip is about 2.0 mm.

13. The module of claim 6, wherein the chip has a tail surface, wherein the tail surface of the chip is located between the air bearing surface of the chip and the back of the chip, and wherein the tail surface of the chip is located in a plane positioned between the air bearing surface of the chip and the bottom surface of the chip; and wherein the substrate has a tail, wherein the tail surface of the substrate is located between the air bearing surface of the substrate and the back of the substrate, and wherein the tail surface of the substrate has a first portion adjoining a rear portion of the first side of the chip receiving slot, and wherein the tail surface of the substrate has a second portion adjoining a rear portion of the second side of the chip receiving slot.

14. The module of claim 13, wherein the tail surface of the substrate is substantially parallel to the air bearing surface of the chip.

15. The module of claim 13, wherein the tail surface of the chip and the tail surface of the substrate are not parallel with the air bearing surface of the chip.

16. The module of claim 6, wherein the first side trough has a bottom, and the second side trough has a bottom.

17. The module of claim 6, wherein the chip is substantially centered along the length of the substrate.

18. The module of claim 6, wherein the distance from the air bearing surface of the substrate to the bonding surface of the chip receiving slot is about 580 μm, and wherein the distance from the air bearing surface of the substrate to the bottom of the first side trough and to the bottom of the second side trough is about 0.65 mm.

19. The module of claim 6, wherein the air bearing surface of the substrate and the air bearing surface of the chip have an Ra of about 50 Å Ra.

20. The module of claim 6, wherein the bottom surface of the chip has a surface roughness between about about 70 Å Ra and about 205 Å Ra.

21. The module of claim 6, wherein the bonding surface of the chip insertion slot has a surface roughness of about 0.8 μm Ra to about 1.6 μm Ra.

22. The module of claim 6, wherein the fist side of the chip is located about 0.1 mm from the first side of the chip receiving slot, and the second side of the chip is located about 0.1 mm from the second side of the chip receiving slot.

23. The module of claim 6, wherein the air bearing surface of the chip is aligned between about −4 μm and about +11 μm from the air bearing surface of the substrate.

24. The module of claim 6, wherein the adhesive is a U.V. curable cyanoacrylate.

25. The module of claim 6, wherein the adhesive has a thickness between the bonding surface of the chip receiving slot and the bottom surface of the chip between about 5 μm and about 60 μm.

26. A tape head read/write module having a composite air bearing surface, the module comprising:

a substrate having an air bearing surface, a front, a back, and a chip receiving slot, wherein the chip receiving slot has a front at the front of the substrate, a back at the back of the substrate, a first side, a second side, a bonding surface, a first side trough proximate to the first side of the chip receiving slot, and a second side trough proximate to the second side of the chip receiving slot, wherein the first side trough has a bottom and the second side trough has a bottom, and wherein the air bearing surface of the substrate has a first portion adjoining the first side of the chip receiving slot, and a second portion adjoining the second side of the chip receiving slot;

a chip that has an air bearing surface, a bottom surface, a front, a back, and active elements, wherein the air bearing surface of the chip has a front located in a plane between the front of the chip and the back of the chip, and wherein the active elements are located proximate to the front of the chip, and wherein the active elements have a surface defining the front of the chip, and wherein the active elements are contiguous with the front of the air bearing surface of the chip, and wherein the chip is inserted in the chip receiving slot in the substrate with the air bearing surface of the chip substantially aligned with the air bearing surface of the substrate, and with the back of the chip substantially aligned with the back of the substrate;

a U.V. cured adhesive layer attached to the bonding surface of the chip receiving slot and the bottom surface of the chip, wherein the adhesive layer fills at least a portion of the fist side trough of the chip receiving slot and a portion of the second side trough of the chip receiving slot;

a closure that has a front, and a back that is attached to the front of the chip, and wherein the closure has an air bearing surface that is substantially coplanar with the air bearing surface of the substrate and the air bearing surface of the chip;

wherein the face of the chip includes a plurality of pads;

wherein the substrate has a first front protrusion that has a face and a second front protrusion that has a face, wherein the face of the first front protrusion and the face of the second front protrusion are substantially parallel with the front of the substrate and the front of the closure;

wherein the chip has a tail surface, wherein the tail surface of the chip is located between the air bearing surface of the chip and the back of the chip, and wherein the tail surface of the chip is located in a plane positioned between the air bearing surface of the chip and the bottom surface of the chip;

wherein the substrate has a tail, wherein the tail surface of the substrate is located between the air bearing surface of the substrate and the back of the substrate, and wherein the tail surface of the substrate has a first portion adjoining a rear portion of the first side of the chip receiving slot, and wherein the tail surface of the substrate has a second portion adjoining a rear portion of the second side of the chip receiving slot;

wherein the tail surface of the substrate is substantially parallel to the air bearing surface of the chip;

wherein the bottom surface of the chip has a surface roughnes between about about 70 Å Ra and about 205 Å Ra;

wherein the bonding surface of the chip insertion slot has a surface roughness of about 0.8 µm Ra to about 1.6 µm Ra; and wherein the adhesive has a thickness between the bonding surface of the chip receiving slot and the bottom surface of the chip between about 5 µm and about 60 µm.

* * * * *